United States Patent
Chen et al.

(10) Patent No.: US 11,704,636 B2
(45) Date of Patent: Jul. 18, 2023

(54) PROXIED CROSS-LEDGER AUTHENTICATION

(71) Applicant: ADI Association, Santa Clara, CA (US)

(72) Inventors: Mark Chen, Newark, CA (US);
Ramesh Kesanupalli, San Jose, CA (US); Soonhyung Lee, Seoul (KR);
Jason S. Burnett, San Jose, CA (US);
Taejin Kim, Seoul (KR); Changsoo Kim, San Jose, CA (US)

(73) Assignee: ADI Association, Santa Clara, CA (US)

( * ) Notice: Subject to any disclaimer, the term of this patent is extended or adjusted under 35 U.S.C. 154(b) by 213 days.

(21) Appl. No.: 17/068,566

(22) Filed: Oct. 12, 2020

(65) Prior Publication Data

US 2021/0133701 A1 May 6, 2021

Related U.S. Application Data (60) Provisional application No. 62/928,943, filed on Oct. 31, 2019.

(51) Int. Cl.
*G06Q 20/06* (2012.01)
*G06Q 20/40* (2012.01)
(Continued)

(52) U.S. Cl.
CPC ....... *G06Q 20/065* (2013.01); *G06Q 20/3821* (2013.01); *G06Q 20/401* (2013.01);
(Continued)

(58) Field of Classification Search
None
See application file for complete search history.

(56) References Cited

U.S. PATENT DOCUMENTS

| | | | |
|---|---|---|---|
| 9,906,512 B2 * | 2/2018 | Camenisch | H04L 9/3268 |
| 10,546,296 B2 * | 1/2020 | Narasimhan | H04L 63/08 |

(Continued)

FOREIGN PATENT DOCUMENTS

| | | | | |
|---|---|---|---|---|
| WO | WO-2020049452 A1 * | 3/2020 | | G06F 16/245 |
| WO | WO-2020181427 A1 * | 9/2020 | | |

OTHER PUBLICATIONS

V. A. Siris, P. Nikander, S. Voulgaris, N. Fotiou, D. Lagutin and G. C. Polyzos, "Interledger Approaches," in IEEE Access, vol. 7, pp. 89948-89966, 2019, doi: 10.1109/ACCESS.2019.2926880. (Year: 2019).*

(Continued)

*Primary Examiner* — Jacob C. Coppola
(74) *Attorney, Agent, or Firm* — Van Pelt, Yi & James LLP (57) ABSTRACT

Proxied cross-ledger authentication techniques are disclosed. In various embodiments, a verifier presentation requirement is determined, the verifier presentation requirement indicating a set of elements required to be provided by a client to authenticate the client. An authentication contract instance is created on a market maker ledger not associated specifically with the verifier, the authentication contract instance including at least a subset of the elements required by the verifier presentation requirement. A verifier system associated with the verifier presentation requirement is configured to read information from the authentication contract instance, obtain from an issuer associated with the client an issuer revocation data associated with the authentication contract instance, and use the information read from the authentication contract instance and the issuer revocation data to authenticate the client.

11 Claims, 3 Drawing Sheets

(51) Int. Cl.
    *G06Q 20/38*    (2012.01)
    *H04L 9/40*     (2022.01)
(52) U.S. Cl.
    CPC .......... *G06Q 20/405* (2013.01); *H04L 63/08* (2013.01); *G06Q 2220/00* (2013.01)

(56) References Cited

U.S. PATENT DOCUMENTS

| | | |
|---|---|---|
| 10,839,378 B1* | 11/2020 | Srinivasan ........... G06Q 20/401 |
| 2008/0034231 A1 | 2/2008 | Ginter |
| 2009/0210347 A1 | 8/2009 | Sarcanin |
| 2013/0317967 A1* | 11/2013 | Novembre ............. G06Q 40/06 |
| | | 705/37 |
| 2015/0006403 A1 | 1/2015 | Shear |
| 2016/0162897 A1 | 6/2016 | Feeney |
| 2017/0232300 A1 | 8/2017 | Tran |
| 2019/0385156 A1* | 12/2019 | Liu .................... G06Q 20/3678 |
| 2020/0014528 A1* | 1/2020 | Nandakumar ........ H04L 9/3239 |

OTHER PUBLICATIONS

Camenisch, J., Kohlweiss, M., Soriente, C. (2009). "An Accumulator Based on Bilinear Maps and Efficient Revocation for Anonymous Credentials." In: Jarecki, S., Tsudik, G. (eds) Public Key Cryptography—PKC 2009. PKC 2009. Lecture Notes in Computer Science, vol. 5443. Springer, Berlin, Heidelberg. (Year: 2009).*

Hosp et al., "COMIT Cryptographically-secure Off-chain Multi-asset Instant Transaction network," arXiv, https://doi.org/10.48550/arxiv.1810.02174, doi = {10.48550/ARXIV.1810.02174}, all pages. (Year: 2018).*

Ali et al., "The Nuts and Bolts of Micropayments: a Survey," arXiv: 1710.02964v1, all pages. (Year: 2017).*

* cited by examiner

PROXIED CROSS-LEDGER AUTHENTICATION

CROSS REFERENCE TO OTHER APPLICATIONS

This application claims priority to U.S. Provisional Patent Application No. 62/928,943 entitled PROXIED CROSS-LEDGER AUTHENTICATION filed Oct. 31, 2019 which is incorporated herein by reference for all purposes.

BACKGROUND OF THE INVENTION

Distributed ledger technology, such as blockchain technology, has been used to provide distributed ledger-based identity networks. Distributed ledger technology enables user identity and/or other claims (e.g., postal address, social security number, passport number, bank account number, etc.), potentially from different issuers, to be verified while protecting privacy and control by each user/owner of the user/owner's data.

More than one distributed ledger-based identity network exists. An entity wishing to be authenticated and/or to have a claim verified (sometimes referred to herein as a Client) may be on a different distributed ledger based identity network than the entity seeking to verify the Client (sometimes referred to herein as a Verifier). Currently, to facilitate cross-ledger transactions (e.g., token exchange), each network must include cross-ledger transaction capability for that ledger pair.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to provide proxied cross-ledger authentication through an intermediary, sometimes referred to herein as a "Market Maker" or "Market Maker Ledger". In various embodiments, the Market Maker provides cross-ledger liquidity for all participating token types and enables Client-Verifier rendezvous across ledgers.

In various embodiments, a solution as disclosed herein allows users of a distributed ledger-based identity network ("Clients") to authenticate to relying parties ("Verifiers") on different ledgers. A solution as disclosed herein has one or more of the following properties, in various embodiments:

1. obviates the need to build cross-ledger transaction capability for every ledger pair
2. prevents transaction delays resulting from low cross-ledger liquidity
3. enables a Verifier-pays economic model while discouraging spend-forcing attacks against Verifiers
4. preserves Client privacy (even against Issuer-Verifier collusion) if the underlying revocation mechanism permits it A solution as disclosed herein may involve one or more of the following roles:

Client: entity wishing to be authenticated by a Verifier. An example is an individual user.

Issuer: entity that signs the Client's public key, binding it to a set of attributes. An example is a passport agency that binds the Client's nationality, date of birth, etc.

Market Maker: intermediary in the authentication transaction. Provides cross-ledger liquidity for all participating token types and enables Client-Verifier rendezvous.

Trust Source: signer of Issuer's signing key. May also be signer of Market Maker's key (though the Market Maker can be its own trust source). The Trust Source's public key is available on all participating ledgers.

Verifier: the relying party in a transaction. An example is an online store.

In various embodiments, a solution as disclosed herein may be used to facilitate cross-ledger transactions, including but not limited to cross-ledger payments. For example, in some embodiments, a Verifier may make a payment to a Client and/or Issuer on another ledger, such as to pay the Issuer for verifying that a claim issued/signed by the Issuer has not been revoked, or paying a Client to provide the user's identity credential and/or other data.

The following terms are used in the description of various embodiments:

Authentication Initiation Contract: smart contract written by the Client to the Market Maker Ledger to initiate an authentication transaction. Pledges a time locked Authentication Security Deposit, which is released back to the Client upon timeout or contract completion.

Authentication Security Deposit: security deposit denominated in Market Maker Ledger Tokens and time locked by the Client in the Authentication Initiation Contract. The purpose of this object is to discourage spendforcing attacks against Verifiers.

Client Authentication Address: address or key pair on the Client Ledger, created by the Client for the purpose of conducting a cross-ledger authentication transaction Client Handle: unique identifier for the Client. Consists of the Client Authentication Address and the Client Public Key.

Client Ledger Token: cryptocurrency unit on the Client Ledger.

Client Public Key: public component of a cryptographic key pair owned by the Client and associated with the Client Authentication Address.

Client Revocation Data: Client-supplied component of publicly verifiable revocation (or validity) data pertaining to the Client Public Key. For example, in a bilinear-map revocation scheme, this would correspond to the witness.

Issuer Authentication Contract: smart contract between Issuer and Verifier, written to the Market Maker Ledger. Stipulates the Issuer Fee amount (to be paid by the Verifier) and commits to release of the Issuer Revocation Data upon payment.

Issuer Fee: fee paid by the Verifier to the Issuer in exchange for the Issuer Revocation Data.

Issuer Handle: unique identifier for the Issuer. Consists of the Issuer's address on the Market Maker Ledger and the Issuer's public key.

Issuer Revocation Data: Issuer-supplied component of publicly verifiable revocation (or validity) data pertaining to the Client Public Key. For example, in a bilinear-map revocation scheme, this would correspond to the accumulator. In other implementations, it may be a simple certificate revocation list. In any case, this value is signed by the Issuer.

Market Maker Ledger: a distributed ledger associated with a Market Maker. In various embodiments, a Market Maker may have and/or comprise its own distributed ledger and/or may use or otherwise be on and/or associated with a distributed ledger operated by another entity, including in some embodiments a ledger on which the Client and/or Verifier happen to be on.

Market Maker Ledger Token: cryptocurrency unit on the Market Maker Ledger.

Market Maker Off-Ledger Address: off-ledger address (for example, a URL) at which the Client connects to the Market Maker.

Validation Requirements: Issuer's requirements for supplying the Issuer's component of the Validity Proof. At minimum, this will include the Issuer Fee expressed in Client Ledger tokens.

Validity Proof: proof of the validity of the Client Public Key. This may be in any agreed form. For example, in a bilinear-map revocation scheme, this would be an actual validity proof (including the Issuer Revocation Data). In other implementations, it may be a simple certificate revocation list.

Verifier Exchange Rate: exchange rate between Verifier Ledger Tokens and Market Maker Ledger Tokens when the Authentication Initiation Contract is instantiated.

Verifier Handle: cross-ledger unique identifier for the Verifier's account on the Market Maker Ledger. Consists of the Market Maker Ledger Identifier, the Verifier's address on the Market Maker Ledger, and the Verifier Public Key.

Verifier Off-Ledger Address: off-ledger address (for example, a URL) at which a transaction participant may communicate with the Verifier Verifier Presentation Requirements: list of Verifier's requirements for performing authentication of a Client, written on the Verifier Ledger. This includes the Verifier Off-Ledger Address, required Client Security Deposit amount, and Security Deposit Target Currency, and may include, for example, a liveness requirement for revocation data. The values in this structure may optionally default to values supplied by the Market Maker via any on- or off-ledger channel.

Verifier Public Key: public component of the cryptographic key pair owned by the Verifier.

Some, all, or none of the above defined terms may be used and/or relevant to a given embodiment.

Figure 1A:
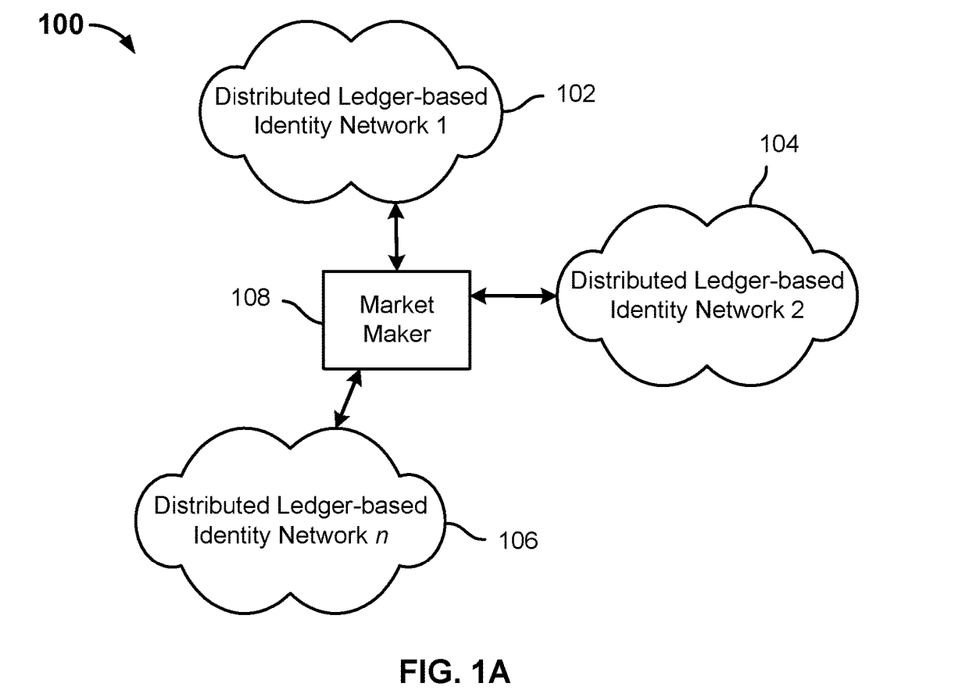
FIG. 1A is a block diagram illustrating an embodiment of a proxied cross-ledger authentication system and environment.

FIG. 1A is a block diagram illustrating an embodiment of a proxied cross-ledger authentication system and environment. In the example shown, system 100 includes a plurality of distributed ledger-based identity networks, represented in FIG. 1A by distributed ledger-based identity networks 102, 104, and 106. A market maker system 108, e.g., a computer server configured to operate as a Market Maker as disclosed herein, is connected via one or more network connections to each of the distributed ledger-based identity networks comprising the plurality of distributed ledger-based identity networks, such as distributed ledger-based identity networks 102, 104, and 106, in this example. In various embodiments, the market maker system 108 acts as an intermediary in authentication transactions, as disclosed herein, including by providing cross-ledger liquidity for all participating token types to facilitate transactions when a client and verifier (or other transaction participant) are on different identity networks. In various embodiments, market maker system 108 and enables Client-Verifier rendezvous, such as by enabling Clients and/or Verifiers to establish identities and/or to initiate and/or consummate transactions on a Market Maker Ledger associated with the market maker system 108.

In the example shown in FIG. 1A the market maker system 108 is represented as being external to the distributed ledger-based identity networks 102, 104, and 106. In some embodiments, market maker system 108 may be included in (e.g., be an entity having an identity and/or participating on) one or more of the distributed ledger-based identity networks 102, 104, and 106.

In various embodiments, Clients, Issuers, and/or Verifiers may each establish a temporary and/or a more permanent or long term use address on a Market Maker Ledger, as disclosed herein, for use in performing authentication and/or other transactions via the Market Maker Ledger. In some embodiments, a Market Maker maintains an account on each of a plurality of participating ledgers and the Market Maker uses its respective accounts on each ledger to perform the Market Maker function disclosed herein. In some embodiments, participants such as Clients, Issuers, Verifiers, and/or the Market Maker may use a universal address that is recognized by/on each participating ledger and/or which can be resolved to an address usable on each ledger.

Figure 1B:
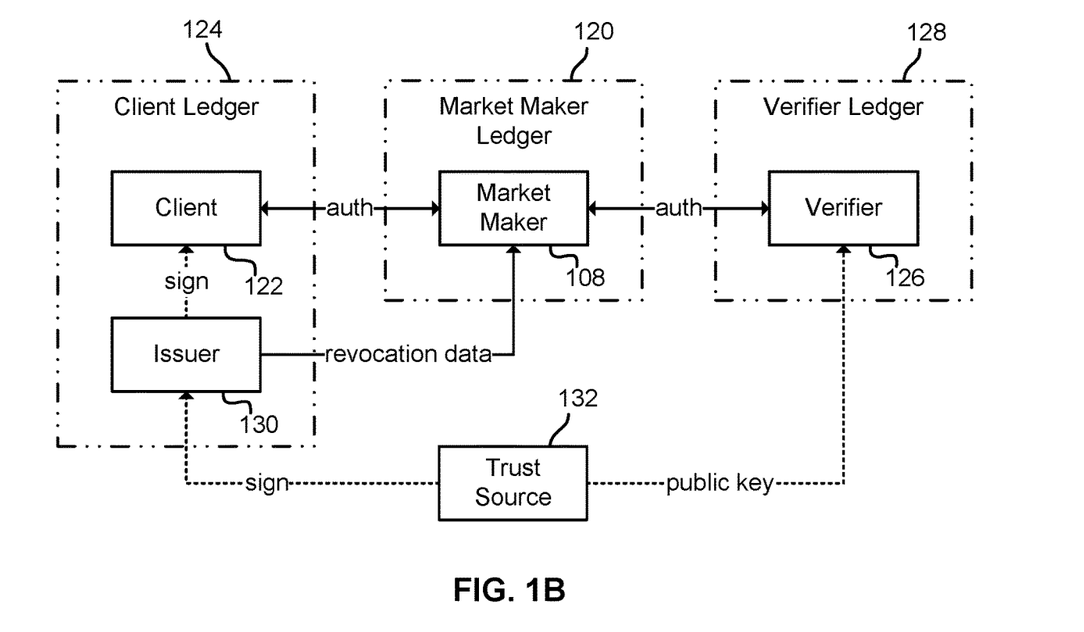
FIG. 1B is a block diagram illustrating an embodiment of a proxied cross-ledger authentication system.

FIG. 1B is a block diagram illustrating an embodiment of a proxied cross-ledger authentication system. In the example shown, market maker system 108 of FIG. 1A is shown to be on a Market Maker Ledger 120. Market maker system 108 is connected, e.g., via one or more networks, to Client 122 on Client Ledger 124 and Verifier 126 on Verifier Ledger 128.

In this example, Client 122, Verifier 126, and Market Maker 108 are all on separate distributed ledgers, and the Client 122 and Issuer 130 are on the same ledger 124. Client 122, Issuer 130, and Verifier 126 each has an address on the Market Maker Ledger 126, and monitors its transactions on Market Maker Ledger 126. In various embodiments, the public keys of Trust Source 132 are available on all participating Ledgers 120, 124, 128 (and/or installed on Client 122, Issuer 130, and Verifier 126 devices). Moreover, the Client 122 knows the Verifier Handle of Verifier 126 (consisting of the Verifier's address on the Market Maker Ledger 120 and the Verifier's public key). This is obtained, in various embodiments, via the Verifier's web site, a QR code, e-mail, text message, or other such mechanism. In various embodiments, all off-ledger channels are encrypted and authenticated via some standard protocol such as TLS.

While in the example shown in FIG. 1B the Client 122 and Verifier 126 are on different ledgers, with a Market Maker Ledger 120 serving as an intermediary, in various embodiments, the Client 122 and Verifier 126 may be on the same ledger. In some embodiments, in cases in which the Client 122 and Verifier 126 are on the same ledger the Market Maker Ledger 120 is not needed or used to perform techniques disclosed herein, including without limitation one or more of the following: Verifier paying Issuer for revocation data; Verifier paying Client for client revocation data and/or other Client data; and requiring the Client to make a security deposit to discourage spend-forcing attacks against the Verifier.

Referring further to FIG. 1B, in various embodiments a client, such as Client 122, is authenticated to a verifying (relying) entity, such as Verifier 126, via a transaction conducted via Market Maker Ledger 120. For example, the Client 122 may determine the Verifier's 126 presentation requirements and initiate a transaction on Market Maker Ledger 120, e.g., an Authentication Initiation Contract. In some embodiments, the Client 122 may initiate the transaction by writing an Authentication Initiation Contract on a ledger other than the Market Maker Ledger 120. The presentation requirements may include a requirement to provide a Client Revocation Data pertaining to the Client Public Key, e.g., a "witness" data in the case of a bilinear-map revocation scheme. The Client 122 may include in the Authentication Initiation Contract information such as the Client Handle, Issuer Handle, Verifier Handle, in some embodiments a refundable deposit (to protect against spend force attacks, e.g., as described below), the Client Revocation Data, and any other information required by the Verifier Presentation Requirements.

The Verifier 126 reads the Authentication Initiation Contract instance from the Market Maker Ledger 120. If Verifier is dissatisfied with any of the Contract terms, the transaction stops and the Client is notified via any on- or off-ledger channel. The Verifier 126 obtains from Issuer 130 Issuer Revocation Data corresponding to the Client Public Key and/or Client Revocation Data obtained from Client 122. The Verifier 126 constructs the Validity Proof from the Issuer Revocation Data and the Client Revocation Data. If the Validity Proof is valid, the authentication of Client 122 is determined to be successful.

In some embodiments, a transaction such as described above may include one or more payments, such as a deposit in a nominal amount by the Client 122, which is refunded or otherwise released at the conclusion of the authentication process. Such a deposit may protect against a "spend force" attack, such as by repeatedly initiating authentication transactions to force a Verifier to spend money (e.g., cryptocurrency) or other resources. A Verifier may also make payments, such as to a Client and/or Issuer, to obtain the Client's data or the Issuer Revocation Data. In various embodiments, a Market Maker and/or Market Maker Ledger as disclosed herein may facilitate cross-ledger transactions by providing cross-ledger liquidity, e.g., by acting as a cryptocurrency exchange and/or by holding funds for Clients and/or Verifiers, e.g., in a currency of the Market Maker Ledger, for use to conduct future transactions.

In some embodiments, a transaction as described above but including payments as described above may be conducted as follows:

1. Client reads Verifier Presentation Requirements from the Market Maker Ledger or from the Verifier via an off-ledger channel
2. Client creates a Client Authentication Address on the Market Maker Ledger for conducting the authentication protocol. If applicable, the controlling key for this address may be signed by another key owned by the Client or belong to an enclosing account structure controlled by the Client
3. Client reads the exchange rate for converting Client Ledger Tokens into Security Deposit Target Currency from any authoritative on- or off-ledger source. For example, this information may be periodically written to the Market Maker Ledger or simply posted on a web site. In some embodiments, the Client obtains this information directly from the Market Maker through an off-ledger channel
4. Client exchanges Client Ledger Tokens for Market Maker Ledger Tokens sufficient for making the Authentication Security Deposit (both values of which, i.e., the Security Deposit Target Currency and the Security Deposit amount, are specified in the Verifier Presentation Requirements read in step 1). This occurs according to the Market Maker's native exchange protocol (e.g., the Bancor protocol or other native protocol).
5. Client creates an Authentication Initiation Contract instance on Market Maker Ledger with the Client Handle, Issuer Handle, Verifier Handle, Client Revocation Data (if any), and Authentication Security Deposit (obtained in step 4, above) supplied as arguments, ensuring that the included Client Revocation Data complies with the Verifier Presentation Requirements (received in step 1). The Authentication Initiation Contract time locks the Client's Authentication Security Deposit (for example, by means of a check-lock-time-verify command) for a duration specified in the Verifier Presentation Requirements. Client may optionally include a higher Deposit amount than the computed required amount in order to compensate for possible exchange-rate fluctuations. Also optionally, the Issuer Handle and Authentication Security Deposit may be written to the Market Maker Ledger separately from the Authentication Initiation Contract (but referenced from it), and the remaining informational contents of the Contract traded to the Verifier through a Zero-Knowledge Contingent Payment (see below) or other escrow protocol. This enables a revenue model for the Client and allows the Verifier to reimburse the Client for any costs related to creation of the Contract
6. Verifier reads the Authentication Initiation Contract instance from the Market Maker Ledger. If Verifier is dissatisfied with any of the Contract terms, the transaction stops and the Client is notified via any on- or off-ledger channel
7. Verifier obtains the exchange rate between Verifier Ledger Tokens and Market Maker Ledger tokens in a manner analogous to step 3, above, then determines if the Authentication Security Deposit is adequate. If not, the transaction stops and the Client is notified via any on- or off-ledger channel 8. Verifier connects to Issuer via any on- or off-ledger channel and sends its Verifier Handle. Optionally, this step may be required to be on ledger in order to discourage spend-forcing attacks against Issuers 9. Issuer supplies Issuer Revocation Data to Verifier in exchange for the Issuer Fee via any trustless exchange protocol, such as Zero-Knowledge Contingent Payment (see below), or through an escrow service provided by a third party (such as the Market Maker) or via any escrow protocol, such as a multi-signature scheme. Example using Zero-Knowledge Contingent Payment:
   a. Issuer encrypts Issuer Revocation Data with Verifier's public key (extracted from the Verifier Handle received in the previous step) to create the first encrypted image E1
   b. Issuer generates a random symmetric key K and uses it to encrypt E1, resulting in the second encrypted image E2
   c. Issuer hashes K to create the hash image H
   d. Issuer creates a signed Issuer Authentication Contract instance that includes E2, H, the required Fee amount (expressed in either Client Ledger Tokens or Market Maker Ledger tokens), and any other relevant terms, and sends it to the Verifier via any on- or off-ledger channel
   e. If Verifier is dissatisfied with any of the Issuer Authentication Contract terms (or with the signature on the Contract), the transaction stops and Client and Issuer are notified via any on- or off-ledger channel
   f. Verifier looks up the current exchange rate between Verifier Ledger Tokens and the currency denominating the required Issuer Fee (received in step d, above) in a manner analogous to step 3, above
   g. Verifier exchanges (through the Market Maker) the required quantity of Verifier Ledger Tokens (calculated from the exchange rate obtained in the previous step) for the Issuer Fee, denominated in Market Maker Ledger Tokens
   h. Verifier creates a signed, hashed time-lock contract instance C containing the Issuer Fee (payable to the Issuer), with the hash condition set to H (the timeout condition may be any value of the Verifier's choosing)
   i. Verifier writes C to the Market Maker Ledger
   j. Issuer reads C from the Market Maker Ledger. If it is dissatisfied with any contract terms, the transaction stops and Issuer is notified via any on- or off-ledger channel; the Issuer, in turn, then notifies the Client
   k. Issuer writes K to the ledger (which is the pre-image of H), thus receiving the payment contained in C
   l. Verifier reads K from the ledger and uses it to decrypt E2, which yields E1
   m. Verifier uses its private key to decrypt E1, which yields the Issuer Revocation Data 10. Verifier constructs the Validity Proof from the Issuer Revocation Data and the Client Revocation Data 11. Authentication Security Deposit is released (via timeout) back to the Client In various embodiments, one or more of the steps 1 through 11 above may be omitted from an operation to authenticate a Client, via a Market Maker, as disclosed herein.

Figure 2A:
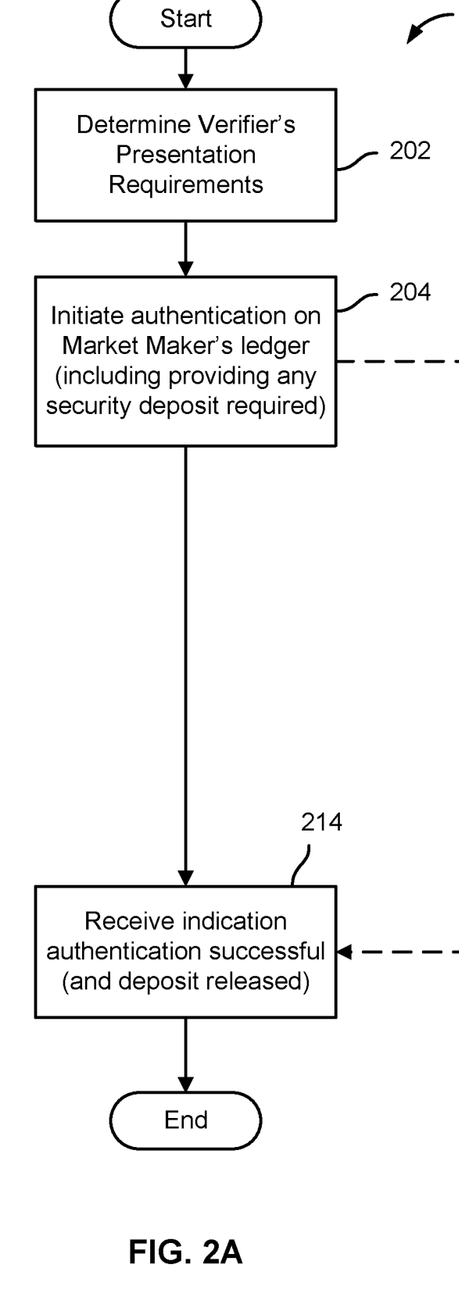
FIGS. 2A and 2B are flow diagrams illustrating an embodiment of a process to perform proxied cross-ledger authentication.
Figure 2B:
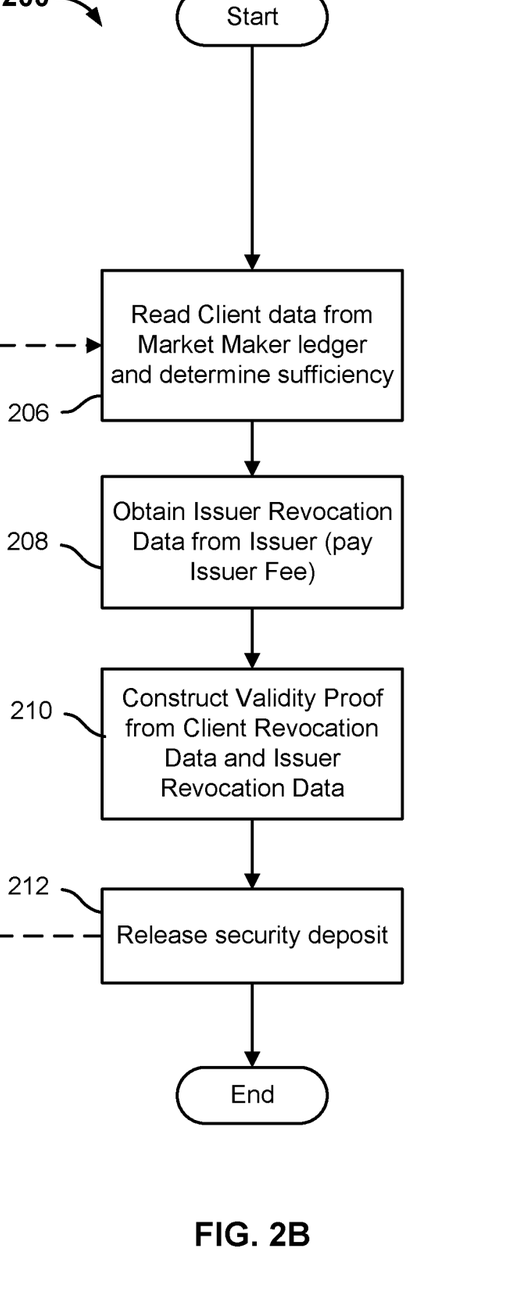

FIGS. 2A and 2B are flow diagrams illustrating an embodiment of a process to perform proxied cross-ledger authentication. Specifically, FIG. 2A shows the authentication process 200 as performed by a client system, device, and/or application, such as Client 122 in the example shown in FIG. 1B, and FIG. 2B shows the authentication process 200 as performed by a verifier, such as Verifier 126 in the example shown in FIG. 1B. In the example shown, at 202 the Client determines the Verifier's Presentation Requirements. At 204, the client initiates an authentication transaction on the Market Maker Ledger, including by providing any required deposit, if any. At 206, the Verifier reads the Client's data from the Market Maker Ledger and determines whether the data satisfies the Verifier's Presentation Requirements. If not, the Verifier terminates the transaction (not shown). If so, at 208 the Verifier obtains Issuer Revocation Data from the Issuer associated with the Client's data (e.g., the Client's Public Key). At 210, the Verifier uses the Client Revocation Data provided by the Client, via the Market Maker Ledger, and the Issuer Revocation Data obtained from the Issuer to construct and verify the Validity Proof. If the Validity Proof fails, the Verifier terminates the transaction (not shown). If the Validity Proof is successful, at 212 the Verifier determines the Client has been authenticated and releases the Client's security deposit (if any). At 214, the Client receives an indication that the authentication has been completed successfully and the deposit is returned (or released) to the Client.

Figure 3:
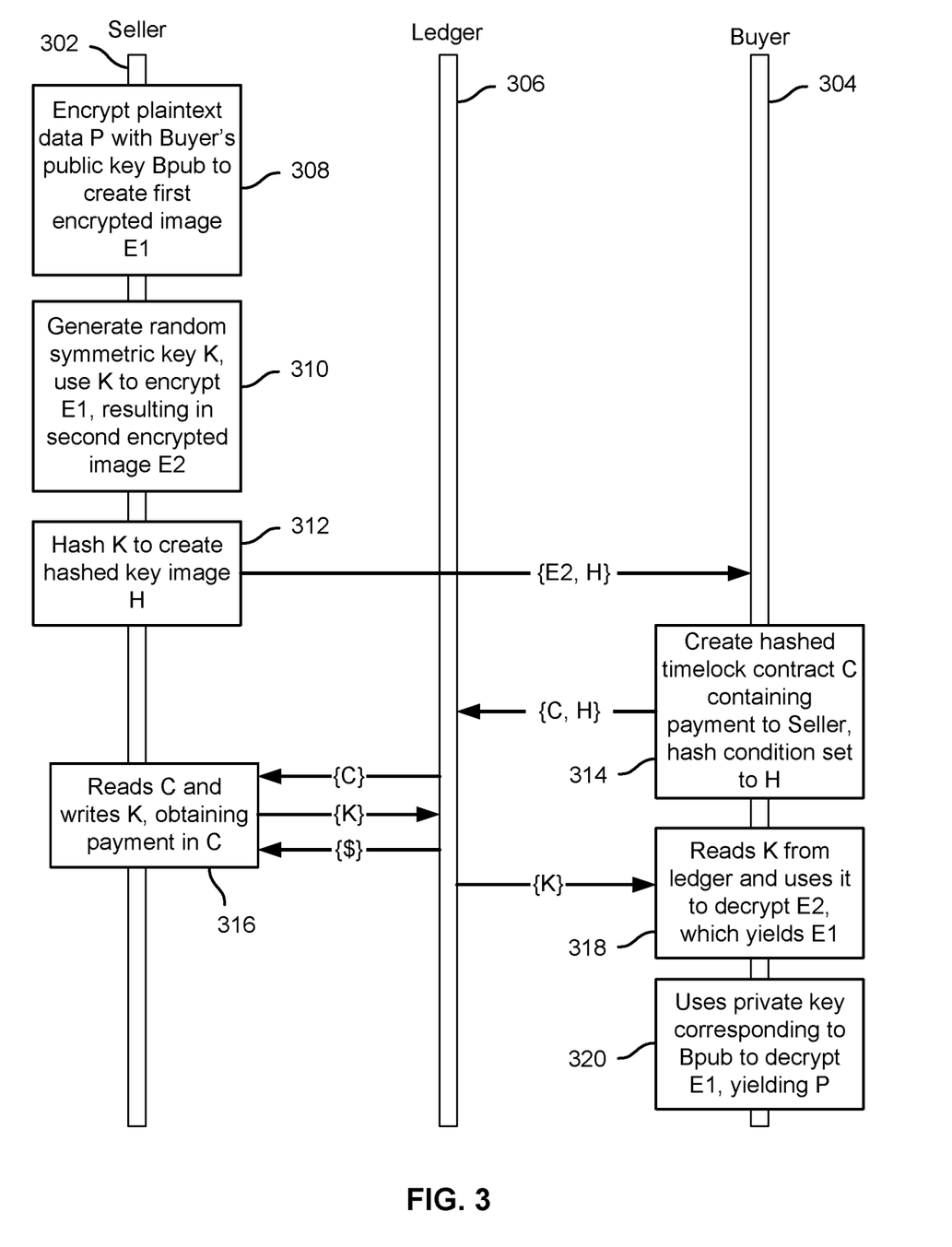
FIG. 3 is a call sequence diagram illustrating an embodiment of a Zero-Knowledge Contingent Payment (ZKCP) system, process, and protocol.

FIG. 3 is a call sequence diagram illustrating an embodiment of a Zero-Knowledge Contingent Payment (ZKCP) system, process, and protocol. In various embodiments, the system, process, and protocol of FIG. 3 may be used to make a zero-knowledge contingent payment in connection with an authentication operation as disclosed herein, such as a payment to a Client for supplying client information or a payment by an Issuer to provide, for example, Issuer Revocation Data.

In the example shown in FIG. 3, a Seller 302 provides information to Buyer 304 in exchange for a zero-knowledge contingent payment made via a ledger 306. In some embodiments, the payment may be made via a Market Maker Ledger, as disclosed herein.

In various embodiments, the system, process, and protocol of FIG. 3 may be used by Seller 302 to sell information to Buyer 304, e.g., for some pre-agreed and/or dynamically negotiated price. Buyer 304 may trust that information disclosed by Seller 302 is correct but does not otherwise need to trust Seller 302 if the technique illustrated in FIG. 3 is used. Likewise, Seller 302 does not need to trust Buyer 304. In various embodiments, payment can occur on any ledger that supports hashing and time locking, while disclosure can occur on any ledger (e.g., Ledger 306, as shown) or off ledger (not shown in FIG. 3). At the end of the protocol, the disclosed information is known only to Seller 302 and Buyer 304 (that is, it is not disclosed publicly).

In various embodiments, the protocol of FIG. 3 is used to guarantee payment to Seller 302 upon release of the Seller's information, and to guarantee to Buyer 304 that the Seller's information will be available to Buyer 304 upon release of payment. The protocol is may be used in situations where it is in Seller's 302 interest to reveal correct information (for example, if Seller 302 is an Issuer or Seller 302 is a Client or other user in a context in which the Seller 302 is highly motivated to disclose only correct information).

In the example shown in FIG. 3, at 308, Seller 302 encrypts plaintext data P with Buyer 304's public key Bpub to create a first encrypted image E1. At 310, Seller 302 generates a random symmetric key K and uses it to encrypt E1, resulting in a second encrypted image E2. At 312, Seller 302 hashes K to create the hashed key image H and Seller 302 sends E2 and H to Buyer 304 via any on- or off-ledger channel. These values (E2, H) may optionally be signed by Seller 302 to allow Buyer 304 to verify their source. At 314, Buyer 304 creates a signed, hashed time-lock contract instance C containing a payment to Seller 302, with the hash condition set to H (the timeout condition may be any value of Buyer's 304 choosing) and writes C to Ledger 306. At 316, Seller 302 reads C from the Ledger 306 and writes K (which is the pre-image of H) to the Ledger 306, thus receiving the payment contained in C. At 318, Buyer 304 reads K from the Ledger 306 and uses it to decrypt E2, which yields E1. At 320, Buyer 304 uses its private key (corresponding to Bpub) to decrypt E1, which yields P, thus completing the transaction.

An example retail commercial transaction facilitated using techniques as disclosed herein follows. In this example, a retailer purchaser referred to as "Customer" purchases from a retail store "Store" a product called "Product" which requires the Store to obtain satisfactory proof that the Customer is at least 21 years of age. In this example, the "Client" is an app on the Customer's phone or other mobile device, and the "Issuer" of the credential that will be presented (e.g., a credentialized data affirming that Customer is age 21 years or older, but which does not disclose the Customer's actual age or birth date) is the DMV, and the "Verifier" is the "Store" or its service provider. In this example, the Client and Issuer ore on a "First Ledger" (e.g., OmniOne™) and the Verifier is on a "Second Ledger" (e.g., Sovrin™). However, in other embodiments and scenarios the entities may be on the same and/or different ledgers.

In this example, Customer arrives at a checkout station at the Store and presents the Product for purchase. Customer will use a DMV-issued digital credential on his phone to prove Customer is 21 years or older. Customer begins the authentication process by starting his authentication app (his Client) and scanning a QR code, for example, displayed or presented at the checkout station. The Client then conducts the following protocol, in various embodiments:

1. Client extracts a URL from the scanned QR code, connects to it, and downloads the Verifiers Presentation Requirements (i.e., Store's presentation requirements, in this example).
2. Customer has a decentralized identity account on the First Ledger blockchain, but the Presentation Requirements inform his Client that the Store's Verifier account is on the Second Ledger blockchain. The Client therefore creates an address on the Market Maker Ledger blockchain, which it will use as an intermediary. In some embodiments, the Client creates a single-use address. In some embodiments, the Client may have a pre-existing, non-single-use address on the Market Maker Ledger and may use the pre-existing address.
3. The Presentation Requirements inform Customer's Client that the Store requires one Second Ledger token as Authentication Security Deposit, to be held for ten minutes (the purpose of which is to discourage spend-forcing attacks). Upon reading the current exchange rates from the Market Maker Ledger, the Client learns that the current exchange rate between Second Ledger tokens and Market Maker Ledger tokens is 3-2, and the rate between First Ledger tokens and Market Maker Ledger tokens is 4-5. The required Authentication Security Deposit is therefore $8/15$ of a First Ledger token. To compensate for possible market fluctuations, Customer's Client computes that $2/3$ of a First Ledger token should be sufficient to meet the Deposit requirement. It therefore presents a screen on his phone that reads, "Store needs a security deposit of $2/3$ of an First Ledger token for ten minutes. Do you agree?" Customer taps the "Yes" button.
4. Customer's Client converts $2/3$ of a First Ledger token into Market Maker Ledger tokens through the Market Maker's exchange service. This exchange happens according to Market Maker's native exchange protocol.
5. Customer's Client creates an Authentication Initiation Contract on the Market Maker Ledger blockchain. This contract time locks Customer's $2/3$ Market Maker Ledger token for ten minutes (as stipulated in step 3, above). The contract also includes a unique identifier extracted from the QR code scanned at the beginning of the transaction.
6. Store reads the Authentication Initiation Contract from the Market Maker Ledger blockchain and sees from the identifier that it corresponds to the transaction currently taking place at Store's checkout station.
7. Store reads the current exchange rates from the Market Maker Ledger blockchain and sees that the rate between Second Ledger tokens and Market Maker Ledger tokens is 5-4 (slightly changed since step 3), and the rate between First Ledger tokens and Market Maker Ledger tokens is still 4-5; however, Customer's deposit of $2/3$ of a First Ledger token is still sufficient to meet the requirement, so the transaction continues.
8. Store extracts the Issuer Handle from the Authentication Initiation Contract (read in step 6, above), connects to the DMV's revocation server, and requests the DMV's Issuer Revocation Data.
9. DMV encrypts the Issuer Revocation Data and writes it to the Market Maker Ledger blockchain, along with the price. Store (if it agrees to the price) purchases the key to the Issuer Revocation Data through a ZKCP protocol (e.g., FIG. 3 above), checking exchange rates and exchanging Second Ledger tokens for Market Maker Ledger tokens as needed (similarly to steps 3 and 4, above). At the end of the exchange, DMV converts the fee into its own native tokens, i.e., First Ledger tokens in this example, but it could be any ledger.
10. Store sees from Customer's Client Revocation Data (extracted from the Authentication Initiation Contract read in step 6, above) that the revocation algorithm for Customer's key is a bilinear map. Store therefore reads the witness component from the Client Revocation Data and the accumulator component from the Issuer Revocation Data and establishes that Customer's public key (and, consequently, any DMV-issued claim bound to it, i.e., the claim that Customer is 21 years or older, in this example) is still valid.
11. Customer's Authentication Security Deposit is (asynchronously) released at the contracted time. At the prompting of his Client app, Customer may decide to leave the released tokens in his account on the Market Maker Ledger blockchain, ready for the next time he needs to perform a cross-ledger authentication as disclosed herein.

With the revocation/validity check of Customer's public key now complete, Customer's Client uses the key and its DMV-bound credentials in a zero-knowledge authentication protocol to prove that Customer is at least twenty-one years of age, and Customer buys the Product.

In various embodiments, techniques disclosed herein may be used to facilitate cross-ledger authentication and other cross-ledger transactions and operations, without having to build cross-ledger transaction capability for every ledger pair.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface; and
a processor coupled to the communication interface and configured to:
determine a verifier presentation requirement, the verifier presentation requirement indicating a set of elements required to be provided by a client to authenticate the client;
create on a market maker ledger not associated specifically with a verifier an authentication contract instance, the authentication contract instance including at least a subset of the elements required by the verifier presentation requirement, wherein the verifier presentation requirement includes a refundable deposit the client is required to make and the processor is further configured to provide the refundable deposit in connection with the authentication contract instance, wherein the client is associated with a first ledger having associated therewith a first ledger cryptocurrency denominated in first ledger tokens and wherein the market maker ledger has associated therewith a market maker ledger cryptocurrency denominated in market maker ledger tokens; and
provide the refundable deposit at least in part by reading a first cryptocurrency exchange rate from the market maker ledger and using a cryptocurrency exchange service associated with the market maker ledger to exchange a quantity of first ledger tokens to a corresponding quantity of market maker ledger tokens to be used to provide the refundable deposit,
wherein a verifier system associated with the verifier presentation requirement is configured to read information from the authentication contract instance, obtain from an issuer associated with the client an issuer revocation data associated with the authentication contract instance, and use the information read from the authentication contract instance and the issuer revocation data to authenticate the client.

2. The system of claim 1, wherein the processor is configured to include in the authentication contract instance a client revocation data and the verifier system is further configured to use the client revocation data and the issuer revocation data to construct a validity proof.

3. The system of claim 1, wherein the processor is configured to include in the authentication contract instance an issuer handle associated with the issuer and the verifier system is configured to use the issuer handle to obtain the issuer revocation data.

4. The system of claim 1, wherein the processor is configured to write an issuer handle associated with the issuer to the market maker ledger at a location indicated in the authentication contract instance and the verifier system is configured to determine the location by reading the authentication contract instance, read the issuer handle from the location, and use the issuer handle to obtain the issuer revocation data.

5. The system of claim 1, wherein the verifier system is associated with a second ledger having a second cryptocurrency denominated in second ledger tokens, the refundable deposit as included in the verifier presentation requirement is expressed in an amount of second ledger tokens, and the processor is configured to read a second cryptocurrency exchange rate to determine an amount of market maker ledger tokens required to provide the refundable deposit.

6. The system of claim 1, the verifier system is associated with a second ledger having a second cryptocurrency denominated in second ledger tokens, and the issuer is associated with a third ledger having a third cryptocurrency denominated in third ledger tokens, and wherein to obtain the issuer revocation data the verifier system is configured to use a cryptocurrency service associated with the market maker ledger to obtain a quantity of market maker ledger tokens equivalent in value to a quantity of third party tokens required by the issuer as an issuer fee to provide the issuer revocation data.

7. The system of claim 6, wherein the verifier system is configured to pay the issuer fee and obtain the issuer revocation data via a zero-knowledge contingent payment transaction made via the market maker ledger.

8. A method, comprising:
determining a verifier presentation requirement, the verifier presentation requirement indicating a set of elements required to be provided by a client to authenticate the client;
creating on a market maker ledger not associated specifically with a verifier an authentication contract instance, the authentication contract instance including at least a subset of the elements required by the verifier presentation requirement, wherein the verifier presentation requirement includes a refundable deposit the client is required to make and providing the refundable deposit in connection with the authentication contract instance, wherein the client is associated with a first ledger having associated therewith a first ledger cryptocurrency denominated in first ledger tokens and wherein the market maker ledger has associated therewith a market maker ledger cryptocurrency denominated in market maker ledger tokens; and
providing the refundable deposit at least in part by reading a first cryptocurrency exchange rate from the market maker ledger and using a cryptocurrency exchange service associated with the market maker ledger to exchange a quantity of first ledger tokens to a corresponding quantity of market maker ledger tokens to be used to provide the refundable deposit,
wherein a verifier system associated with the verifier presentation requirement is configured to read information from the authentication contract instance, obtain from an issuer associated with the client an issuer revocation data associated with the authentication contract instance, and use the information read from the authentication contract instance and the issuer revocation data to authenticate the client.

9. The method of claim 8, wherein a client revocation data is include in the authentication contract instance and the verifier system is further configured to use the client revocation data and the issuer revocation data to construct a validity proof.

10. The method of claim 8, wherein the verifier system is associated with a second ledger having a second cryptocurrency denominated in second ledger tokens, and the issuer is associated with a third ledger having a third cryptocurrency denominated in third ledger tokens, and wherein to obtain the issuer revocation data the verifier system is configured to use a cryptocurrency service associated with the market maker ledger to obtain a quantity of market maker ledger tokens equivalent in value to a quantity of third party tokens required by the issuer as an issuer fee to provide the issuer revocation data.

11. A computer program product embodied in a non-transitory computer readable medium, comprising computer instructions for:

determining a verifier presentation requirement, the verifier presentation requirement indicating a set of elements required to be provided by a client to authenticate the client;

creating on a market maker ledger not associated specifically with a verifier an authentication contract instance, the authentication contract instance including at least a subset of the elements required by the verifier presentation requirement, wherein the verifier presentation requirement includes a refundable deposit the client is required to make and providing the refundable deposit in connection with the authentication contract instance, wherein the client is associated with a first ledger having associated therewith a first ledger cryptocurrency denominated in first ledger tokens and wherein the market maker ledger has associated therewith a market maker ledger cryptocurrency denominated in market maker ledger tokens; and     providing the refundable deposit at least in part by reading a first cryptocurrency exchange rate from the market maker ledger and using a cryptocurrency exchange service associated with the market maker ledger to exchange a quantity of first ledger tokens to a corresponding quantity of market maker ledger tokens to be used to provide the refundable deposit,     wherein a verifier system associated with the verifier presentation requirement is configured to read information from the authentication contract instance, obtain from an issuer associated with the client an issuer revocation data associated with the authentication contract instance, and use the information read from the authentication contract instance and the issuer revocation data to authenticate the client.

\* \* \* \* \*